(No Model.)
2 Sheets—Sheet 1.
H. W. EISENHART.
SPRING TOOTH HARROW.
No. 485,493.  Patented Nov. 1, 1892.
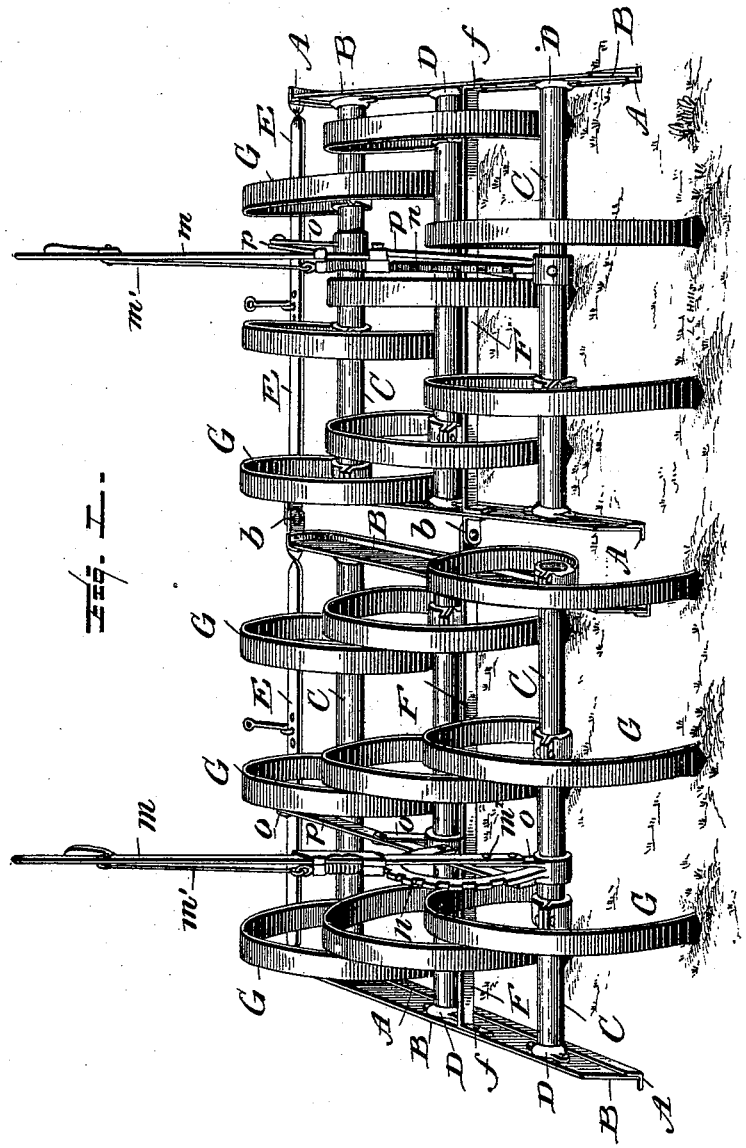
Witnesses
L. C. Hills
Ewella Dick
Inventor
Henry W. Eisenhart
by Marcellus Bailey
his Attorney

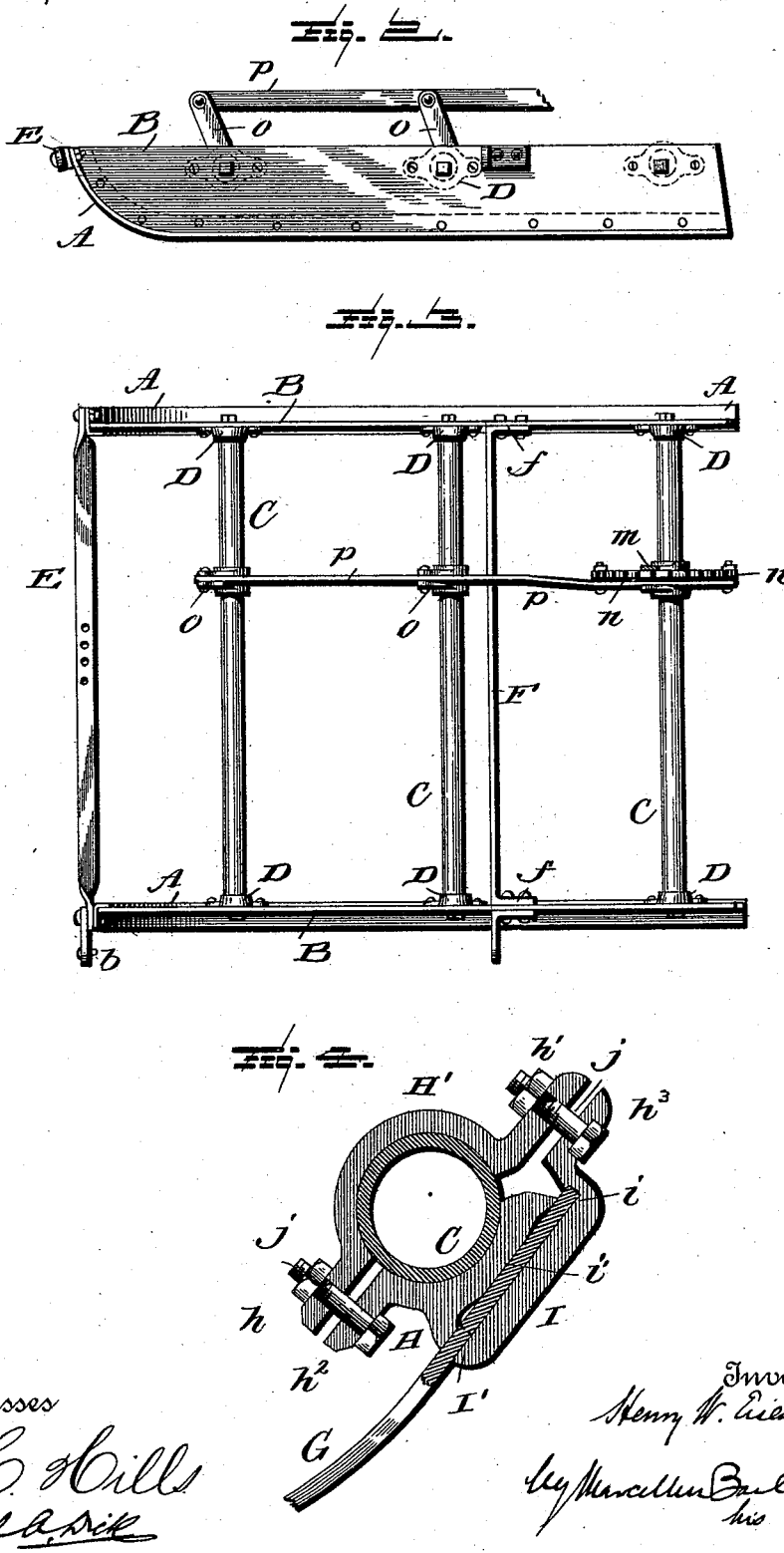

UNITED STATES PATENT OFFICE.

HENRY W. EISENHART, OF YORK, PENNSYLVANIA, ASSIGNOR TO ARTHUR B. FARQUHAR, OF SAME PLACE.

SPRING-TOOTH HARROW.

SPECIFICATION forming part of Letters Patent No. 485,493, dated November 1, 1892.

Application filed February 4, 1892. Serial No. 420,264. (No model.)

*To all whom it may concern:*

Be it known that I, HENRY W. EISENHART, of York, in the State of Pennsylvania, have invented certain new and useful Improvements in Spring-Tooth Harrows, of which the following is a specification.

My invention relates to that kind of harrow which may be termed a "runner-float" harrow—that is to say, a harrow the sides of the frame of which form runners which can be used to support the harrow as it is moved from place to place and to limit the extent of penetration of the teeth when the harrow is in use.

In the harrow to which my invention relates the teeth (which are spring-teeth of the kind shown in Garver's expired patent, No. 95,458, of October 5, 1869) are attached to rock-bars which are mounted in the harrow-frame and are linked together, so as to be simultaneously operated by a single lever, so as to raise or lower the teeth, as desired. A harrow of this general kind is old and public property.

A harrow having runners or their equivalents is shown, for example, in Patents No. 26,179, of November 22, 1859, and No. 92,614, of July 13, 1869. For the purpose of regulating the penetration of the teeth, &c., sometimes the runners have been adjustable and the tooth-bars stationary, as in Patents Nos. 26,179 and 357,377, of February 8, 1887, and at other times the runners have been fixed and the tooth-bars have been pivoted so as to rock, as in Patent No. 155,037, of September 15, 1874. So, also, it is not new to mount harrow-teeth, whether rigid or spring teeth, upon rock-bars simultaneously adjusted by a single lever, this being shown, for example, in Patents No. 57,166, of August 14, 1866, No. 144,236, of November 4, 1873, No. 241,744, of May 27, 1881, and No. 269,069, of December 12, 1882. Spring-teeth mounted and individually adjustable upon a supporting-bar are not new. Such a construction is shown, for example, in Paddock's patent, No. 125,216, of April 2, 1872, and Reed's patent, No. 201,946, of April 2, 1878. Nor is it new to pivot the bar on which such teeth are adjustably mounted so that it will rock, for that also is shown in Paddock's patent last-above named.

My invention consists in certain details of construction of the frame and also of the holders for the spring-teeth, which can best be explained and understood by reference to the drawings accompanying this specification.

My object in my improved construction of the frame is to secure lightness, simplicity, strength, and cheapness, and in the new form of tooth-holder which I have devised is one intended more particularly to permit the holder to be put on and taken off its bar with ease and expedition, while at the same time the tooth itself, when the holder is in place, will be held with the utmost firmness without, however, requiring any positive connection by bolts or the like between the holder and the bar.

In the drawings, Figure 1 is a general view of the harrow. Fig. 2 is a side elevation of one of the sections of which it is composed. Fig. 3 is a plan of this section with the teeth and tooth-holders removed. Fig. 4 is a longitudinal vertical section, on enlarged scale, of a tooth-holder which may be advantageously employed in the harrow, showing, also, in cross-section the pipe-bar on which said holder is mounted.

The runners are formed each of a bar of metal A, (preferably steel,) of L or T cross-section, preferably the former, and a thin vertical metallic web B, preferably of steel also. The bar A, which forms the shoe of the runner, is curved upward at front, so as to enable it to ride easily over obstructions. The web B is riveted in vertical position to the upright member of the bar and is intended to form a sure and unyielding support for the tooth-bars C. To this end I provide sockets or bearings D, (of cast-iron, preferably,) which are riveted to the interior opposite faces of the webs of the two runners with which each harrow-section is provided, these two runners forming the sides of the frame of the sections. The bars C are tubular, being made, usually, of gas-piping, and their ends are received in and supported by the cylindrical sockets D, in which the bars are capable of rotating or rocking. At the front of the section is a cross-bar E, (which forms in effect a clevis-bar as well as a cross-brace,) bolted or otherwise secured at its ends to the fronts of the runner-shoes A, and further back is still another cross-bar F, provided at its ends with broad feet *f*, which take an extended bearing upon the runner webs D in a direction lengthwise of the harrow and are firmly bolted or otherwise suitably secured thereto. This completes the frame, which, as shown, consists simply of the shoes A, the webs B, and the cross brace-bars E F. The webs under these conditions afford a sure and permanent bearing for the tooth-bars, and the frame itself, although light and easily taken apart, when put together is very strong, and will effectually resist the torsional or twisting strains to which it is often subjected when in use. Owing to the form and construction of parts, trash cannot catch and accumulate on the frame, as it would, for example, were the tooth-bar bearings in independent and separate posts instead of upon the interior opposite faces of the continuous webs.

The harrow consists of two sections, which are jointed together at the points *b* by horizontal longitudinal pivot or hinge pins. The teeth G can be secured to the bars in any known or suitable way. They may be bolted directly to the bars or they may be secured by clamps held by bolts passing through the bars; but to avoid the bother and trouble of drilling the bars for the passage of bolts, as well as to prevent the possible weakening of the bars from this cause, I prefer to secure the teeth by holders which have friction clamps or clips, which can be drawn close and tight around the bars. A holder of this general kind is shown, for example, in Patent No. 465,173, of December 15, 1891; but in this holder the clip-ring is split on one side only, and it becomes necessary, therefore, to put all the holders upon the bars before the latter are secured in place in the frame. To avoid this necessity and also to permit any one holder to be subsequently removed from the bar without taking apart the harrow, I can make use of the holder (devised for this purpose) shown in Fig. 4. In this holder the ring or clip which clamps upon the tooth-bar C is split crosswise into two parts H H′. The one part H′ is formed with ears $h$ $h'$, one at each end. The other part H is formed with an ear $h^2$ at one end only. It is further formed upon its exterior with a tooth-seat *i* and is cast in one with a clamp-plate I, one end of which is fast to the ring, the clamp-plate thence extending along opposite to the seat *i*, but at such distance therefrom as to leave between it and the seat a socket for the reception of the tooth. The free end of the clamp-plate has at its extremity an ear $h^3$. The tooth is inserted into the socket through a slot formed in the shoulder I′, which connects the clamp-plate to the ring-section H. The ears $h$ $h^2$ and $h'$ $h^3$ are drawn together by bolts and nuts *j*. The bolt which passes through the ears $h'$ $h^3$ not only serves to draw the ring-sections together, but also to draw the clamp-plate down upon the tooth. By removing the bolts *j* the holder comes apart and can readily be removed from the tooth-bar.

I am aware that a two-part clip or ring in a spring-harrow-tooth holder is not new, broadly considered. Such a holder is shown, for example, in Patent No. 269,069, of December 12, 1882. In that device, however, the tooth is inserted and held between one of the pair of ears on the ring-sections by which said sections are held together, the upper one of the pair of ears being provided with a rearward extension to sustain the tooth against upward strain. There is no clamp-plate, nor is there a tooth-socket outside of the ears themselves, and the bolt which passes through the ears passes, also, through the end of the tooth interposed between the ears.

The rocking tooth-bars C of each section are connected together, so as to be operated and moved in unison by a single lever *m* (provided with the usual spring-depressed latch-rod *m′*) by means of crank-arms *o*, fastened on the tooth-bars by ring-clips and pivoted or jointed at their outer ends to the longitudinal connecting-bar *p*. The lever *m*, which also is clipped to one of the tooth-bars, is pivoted or jointed to the connecting-bar *p* at $m^2$, and its spring-depressed latch-rod *m′* normally engages the ratchet or toothed sector *n*, fast to the connecting-bar *p*. In this way all of the teeth can be lifted, lowered, or set for any depth of penetration desired.

Having now described my improvements, what I claim, and desire to secure by Letters Patent, is—

1. The harrow or harrow-section consisting of the side runners formed of shoe-bars A, of L or equivalent cross-section, and the vertical metallic webs B, riveted to the upright members of the shoe-bars, the cross stay or brace rods connecting said runners, the sockets or bearings D, secured to the interior opposite faces of the webs, the tooth-bars supported at their ends in said sockets, spring-teeth mounted on the tooth-bars, and the lever *m*, ratchet *n*, crank-arm *o*, and connecting-bar *p*, all constructed and arranged in the manner shown and set forth.

2. The tooth-holder composed of the ring-section H′, provided with ears $h$ $h'$, and the ring-section H, having an ear $h^2$ and a tooth-seat *i* and formed or provided with the clamp-plate I, having at its free end an ear $h^3$, and bolts and nuts for securing the two sections and the tooth, substantially as and for the purposes hereinbefore set forth.

In testimony whereof I affix my signature in presence of two witnesses.

HENRY W. EISENHART.

Witnesses:
JOHN W. BRANT,
F. J. EVANS.